United States Patent [19]
Elton et al.

[11] Patent Number: 5,282,667
[45] Date of Patent: Feb. 1, 1994

[54] VEHICLE SEAT ASSEMBLY WITH INTEGRAL CHILD SEAT

[75] Inventors: Robert D. Elton, Ann Arbor; Robert L. Demick, Eastpoint; Sandra L. Smith, Waterford; Steve W. Kennel, Ann Arbor; Kurt A. Bart, New Haven, all of Mich.

[73] Assignee: Hoover Universal, Inc., Plymouth, Mich.

[21] Appl. No.: 811,021

[22] Filed: Dec. 20, 1991

[51] Int. Cl.⁵ ............................................. A47C 15/00
[52] U.S. Cl. .................................. 297/238; 297/410; 297/467; 297/484
[58] Field of Search ............. 297/238, 410, 467, 484

[56] References Cited

U.S. PATENT DOCUMENTS

| | | |
|---|---|---|
| 3,462,193 | 8/1969 | Tamura ................. 297/410 |
| 4,690,455 | 9/1987 | Bailey et al. . |
| 4,756,573 | 7/1988 | Simin et al. . |
| 4,900,086 | 2/1990 | Steward . |
| 4,900,087 | 2/1990 | Crisp . |
| 4,936,627 | 6/1990 | Guim . |
| 4,943,112 | 7/1990 | Law . |
| 5,031,962 | 7/1991 | Lee ....................... 297/484 |
| 5,106,158 | 4/1992 | Dukatz et al. ........ 297/238 X |
| 5,925,117 | 6/1992 | Vander Stel et al. . |

Primary Examiner—James R. Brittain
Attorney, Agent, or Firm—Harness, Dickey & Pierce

[57] ABSTRACT

A vehicle seat assembly is disclosed containing an integrated child seat having a child seat cushion and headrest stored within the seat back of the seat assembly. The child seat is deployed by raising the child seat headrest from an upper portion of the seat back and rotating the child seat cushion from the seat back forward to a generally horizontal use position overlying the adult seat cushion. The seat assembly of the present invention includes a floating pivot axis for the child seat cushion to enable the seat cushion attaching hardware to be placed rearward from the face of the seat back to improve adult seating comfort. The buckle for the child seat restraint system is pivotally mounted directly to the child seat cushion enabling a user to easily insert a latch plate of the restraint system into the buckle with one hand freeing the other hand for restraining the child. The child seat further includes a protective flap extending forward from the child seat cushion to protect the upholstery of the adult seat cushion from wear and dirt from the shoes of a child seat occupant.

19 Claims, 6 Drawing Sheets

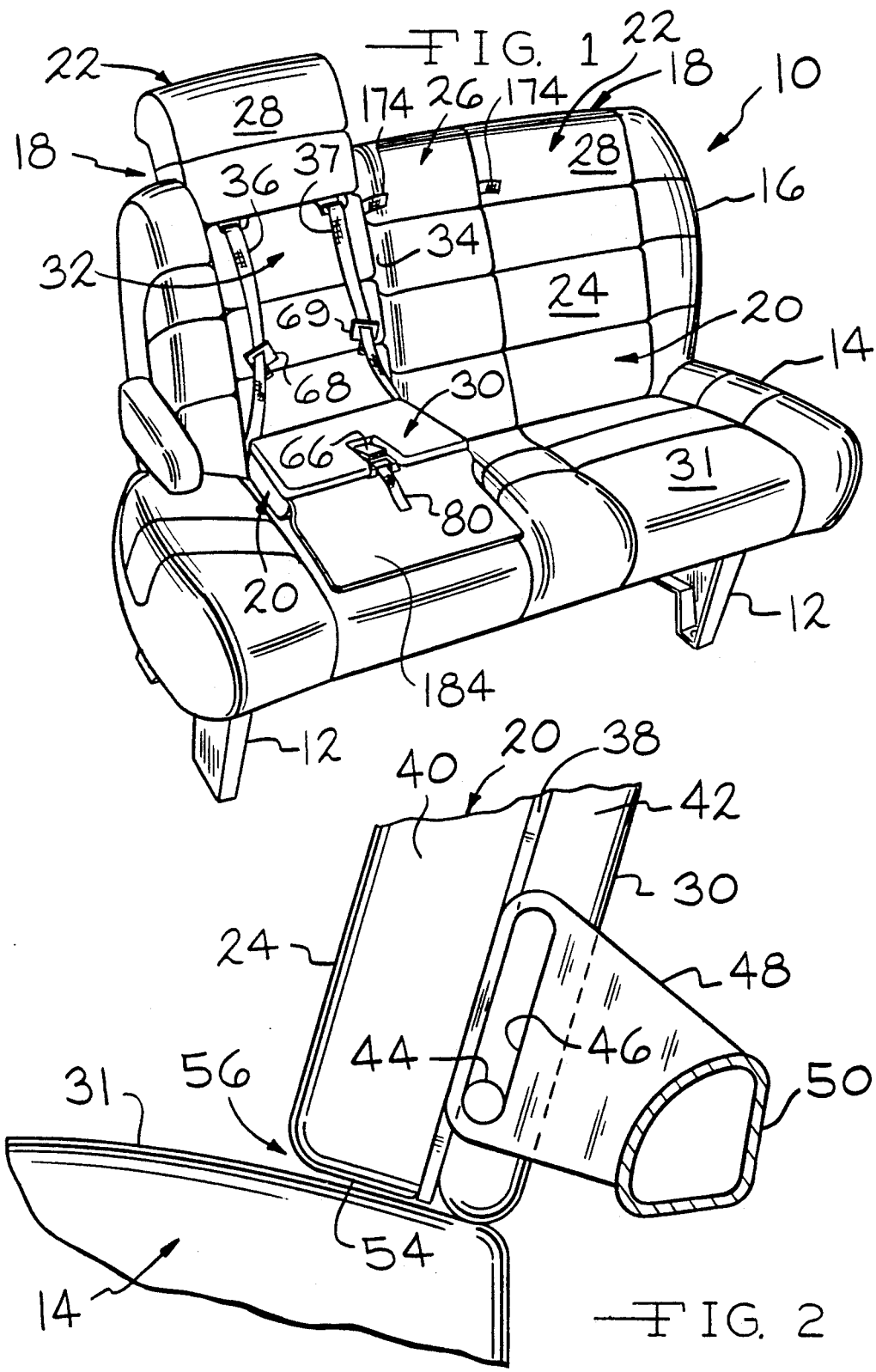

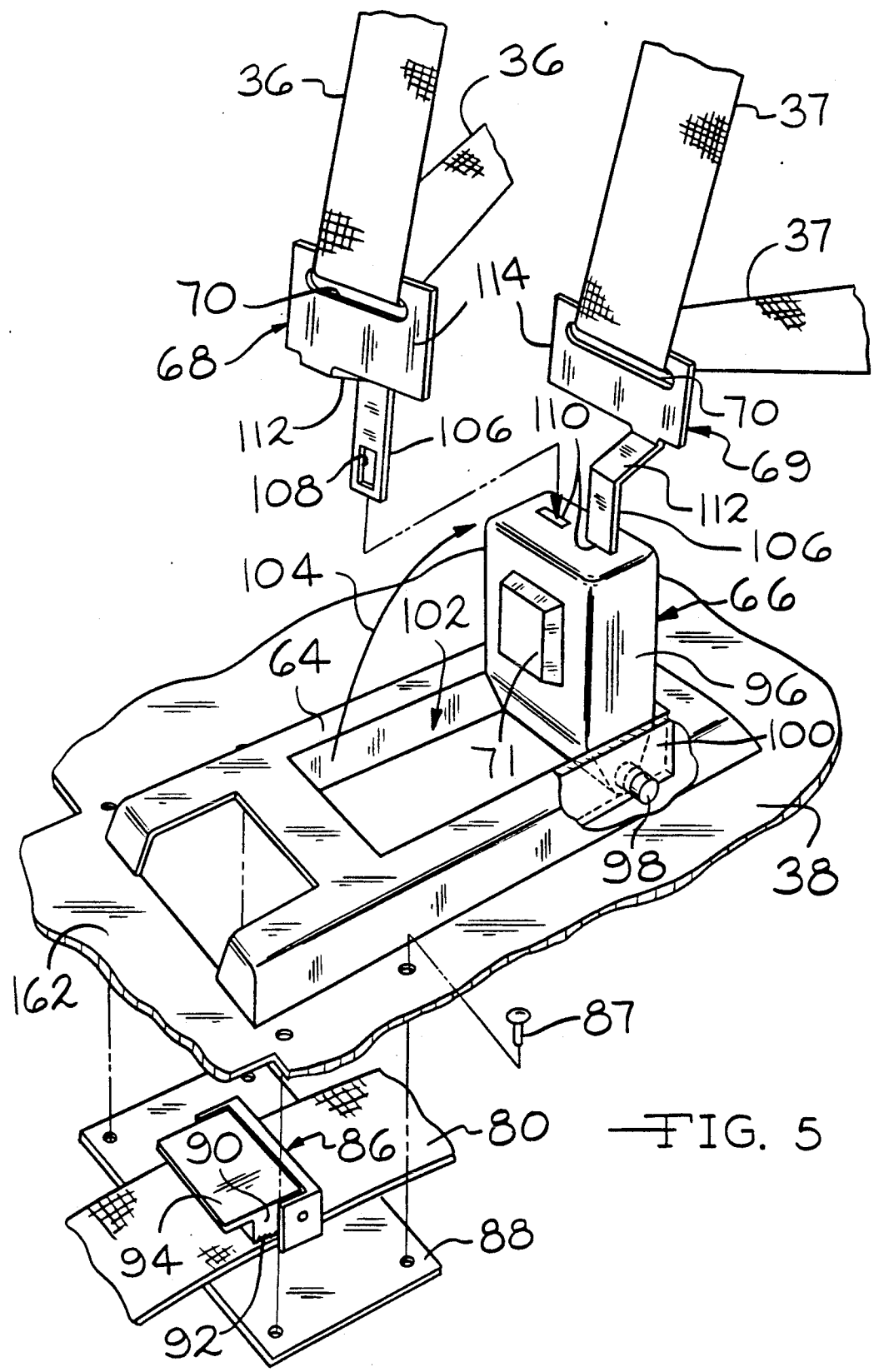

VEHICLE SEAT ASSEMBLY WITH INTEGRAL CHILD SEAT

BACKGROUND AND SUMMARY OF THE INVENTION

The present invention relates to a vehicle seat assembly and in particular to a seat assembly having an integral child seat. The child seat is conveniently stored within the seat assembly, enabling the seat assembly to be used by an adult passenger. When desired, the child seat can be deployed for use in providing a seat for a small child.

Several seat assemblies with integral child seats have been developed or proposed. However, many of these suffer from one or more deficiencies that compromise the usefulness of the seat assembly and/or its comfort. In particular, due to the added mechanical features of the child seat, comfort of the seat assembly when used by the adult is reduced. This is particularly true in the case where the child seat is contained solely within the seat back of a seat assembly, where limited space is available for packaging of the child seat.

Child seats, whether integrated with a vehicle seat or a separate seat assembly, typically include a restraint system for the child occupant that includes a buckle mounted to the child seat between the legs of the child occupant. These buckles are sometimes attached by a short piece of belt webbing to allow movement of the buckle while the restraint system is being positioned around the child. However, such a flexible mounting of the buckle necessitates that two hands be used by the person buckling the child into the child seat. One hand is used to hold the buckle in place while the other hand is used to insert the belt latch plate into the buckle.

Another problem often found with integral child seats is the placement of the child's shoes on top of the adult seat cushion of the seat assembly. This results in additional wear and soiling of the adult seat cushion cover by the child's shoes.

Accordingly, it is the object of the present invention to improve upon seat assemblies with integral child seats by overcoming the above problems.

It is a feature of the seat assembly of the present invention to improve the adult seating comfort by moving the child seat hardware, particularly the pivotal attachment of the child seat cushion, as far rearward from the face surface of the adult seat back as possible. This is accomplished through a floating pivot axis for the child seat cushion by providing the child seat cushion with a pair of attaching pins contained within slots formed in the seat back frame. This allows the effective pivot point to rise as the child seat cushion is lowered. The child seat cushion is free to float vertically as the foam on the child seat cushion and the adult seat cushion is compressed.

It is an advantage that the packaging of the child seat cushion is enhanced within the adult seat back, ensuring that the bite line between the adult seat cushion and adult seat back is maintained and also enables the child seat hardware to be packaged as far from the face surface of the seat back as possible to improve adult seating comfort.

It is another advantage of the present invention that the restraint system buckle is pivotally mounted directly to the child seat cushion for rotation about a fixed axis. This rigidly supports the buckle, enabling a user to insert the latch plate into the buckle with only one hand by merely pushing the latch plate into the buckle, freeing the other hand to restrain the child, etc.

It is yet another feature of the invention to provide protection for the adult seat cushion from the child's shoes. This is accomplished by providing a removable protective flap of either vinyl or fabric material overlying the adult seat cushion forwardly of the child seat cushion.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the seat assembly of the present invention containing an integral child seat;

FIG. 2 is a fragmentary side elevational view of the attachment of the child seat cushion to the seat back frame with the child seat cushion in an upright, stowed position;

FIG. 5 is an enlarged exploded view of a portion of the child seat restraint system showing the buckle and latch plates;

DETAILED DESCRIPTION OF THE DRAWINGS

Figure 3:
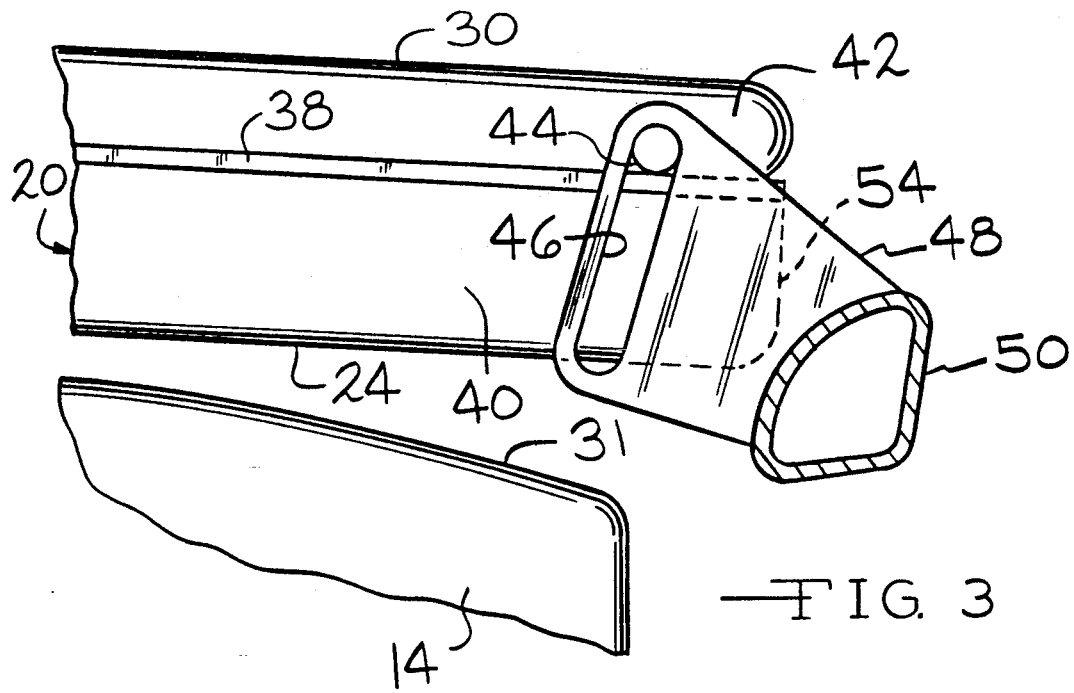
FIG. 3 is a fragmentary side elevational view similar to FIG. 2 with the child seat cushion in a forward use position.

The seat assembly of the present invention is shown in FIG. 1 and designated generally as 10. Seat assembly 10 is shown as a bench seat, however, it is to be understood that the invention is not limited to a bench seat. Bench seat 10 includes a pair of left and right support legs 12 through which the seat assembly is mounted to a vehicle. The bench seat is formed by a seat cushion 14 and a seat back 16 that extends generally upwardly at the rear of the seat cushion 14. The seat cushion 14 and seat back 16 are configured to provide seating for an adult vehicle occupant. Both the seat cushion and seat back are formed by a frame structure covered with foam padding and upholstery in a conventional manner.

The seat back 16 is formed with a pair of child seats 18 on each side of seat assembly 10. The terminology "right" and "left" used to describe the seat refer to the vehicle right and left into which the seat assembly is installed. The child seat 18 on the right side is in a deployed, use position, while the child seat on the left side of the seat back is in its stowed position enabling use of the left side of the seat by an adult. The child seat 18 is comprised of two principal components, a child seat cushion 20 and a headrest 22. The child seat cushion 20 has a front face surface 24 that forms a portion of the face surface 26 of the seat back 16. Likewise, the headrest has a face surface 28 that forms a portion of the seat back face surface 26. To deploy the child seat, the headrest 22 is raised from a stowed position, shown on the left side of the seat assembly in FIG. 1, to a raised position, shown on the right side of the seat assembly in FIG. 1. While being raised, the headrest is also moved rearward. The child seat cushion 20 is then rotated forwardly and downwardly about a pivot axis adjacent to the base of the seat back.

Figure 6:
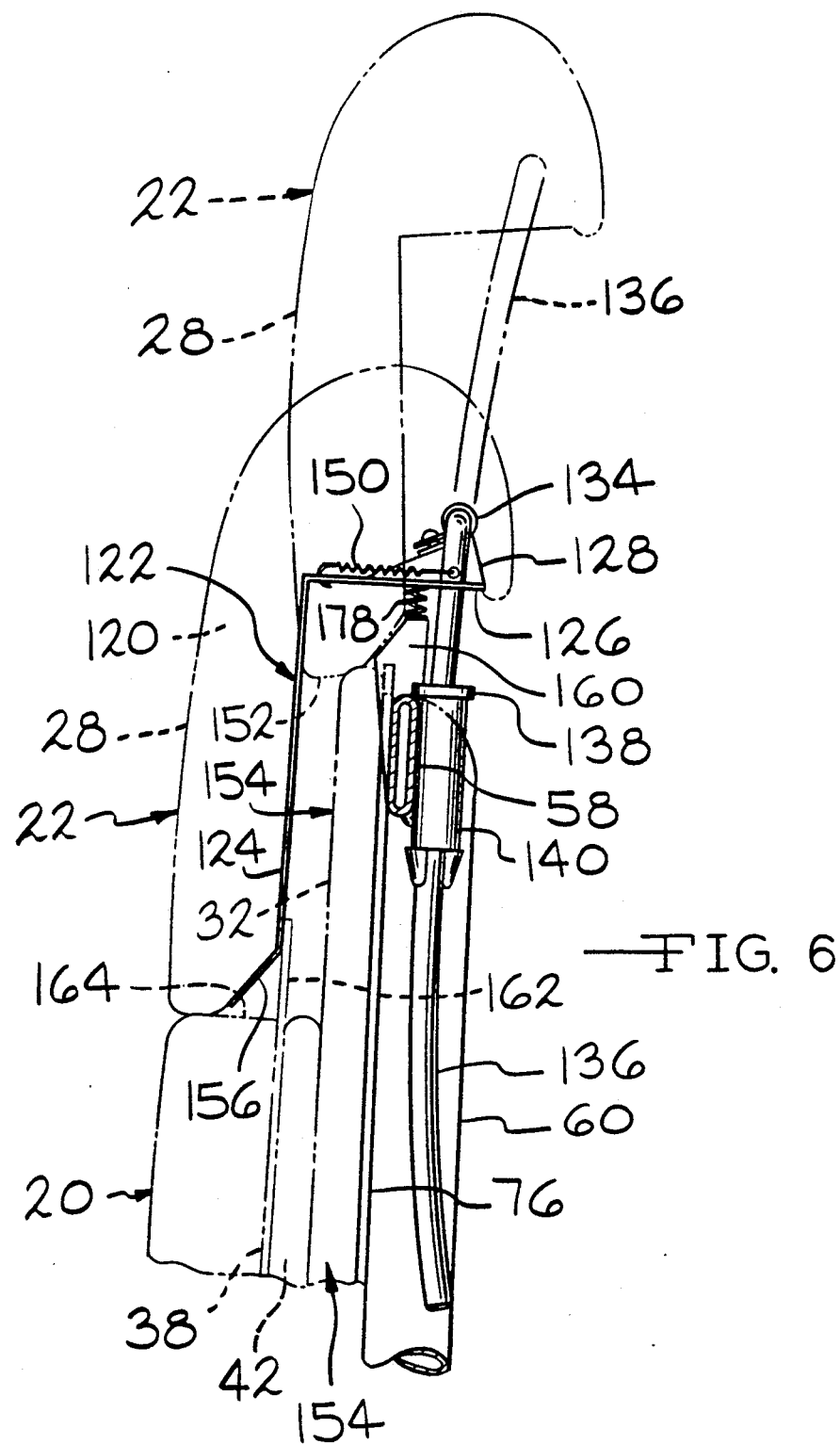
FIG. 6 is a side elevational view of the upper portion of the seat back illustrating the child seat headrest.

Once deployed, the child seat cushion 20 forms a seating surface 30 for a child occupant. A recess is revealed in the seat back with a child seat face surface 32 spaced rearwardly from the face surface 26 of the adult seat back. A pair of side bolsters 34 are formed on both sides of the child seat back face surface 32 to provide lateral protection for a child occupant. The seating surface 30 of the child seat cushion is raised from the surface of the adult seat cushion 14, creating a booster seat for the child. When the headrest 22 is raised, the face surface 28 forms a general continuation of the child seat back face surface 32. (FIG. 6). When the child seat is deployed, a restraint system is also revealed. Additional details of the restraint system will be described below.

The attachment of the child seat cushion 20 to the seat back frame is shown in greater detail in FIGS. 2 and 3. The seat cushion 20 is formed of a structural plate 38 made of stamped steel or a molded resin that gives the seat cushion 20 some structural rigidity. An upholstered foam pad 40 is positioned on the front/bottom side of the plate 38 and forms part of the seat back cushion for an adult. The rear/top of the plate 38 is covered by an upholstered pad 42 which will be described in greater detail below. A pair of pivot pins 44 are attached to the plate 38 with one pin at each side of the plate, adjacent the base of the seat back. The pivot pins 44 are contained in slots 46 in mounting flanges 48 welded to the lower tube 50 of the seat back frame 52.

When the seat cushion 20 is in the stowed position shown in FIG. 2, the pivot pin 44 is at the lower end of the slot 46. In this position, the lower edge 54 of the seat cushion 20 is positioned very close to the face surface 31 of the seat cushion, providing a close fit between the seat back and seat cushion at the bite line 56. As the seat cushion 20 is rotated downward to the use position shown in FIG. 3, the pivot pins 44 move upwardly through the slots 46, to the upper end of the slots as shown in FIG. 3. This enables the lower edge 54 of the child seat cushion to clear the adult seat cushion 14 as the child seat cushion is pivoted forward to the use position. As a result, the pivot axis of the seat cushion floats relative to the stationary seat cushion 14. The floating pivot axis is needed because the pivot pins 44 are located rearward of the surface 24. If the pivot pins 44 were located adjacent to the surface 24 of the child seat cushion 20, it would not be necessary to have a floating pivot axis to provide clearance between the lower edge 54 of the child seat cushion and the bench seat cushion 14. However, if the pivot axis were located adjacent to the surface 24, the mounting flange 48 and the rigid structure of the child seat cushion would be positioned close to an adult seat occupant, resulting in decreased seating comfort for an adult. By placing the pivot axis rearward from the face surface 24, adult seating comfort is improved and, by utilizing a floating pivot axis, a close fitting bite line 56 can be formed. In the use position shown in FIG. 3, the forward portion of the seat cushion 20 rests upon the bench seat cushion 14 to support the seat cushion 20. When the child seat is occupied, compression of the foam pad 40 as well as the seat cushion 14 due to the weight of the child will result in downward movement of the pivot pins 44 in the slots 46 as the child seat cushion floats.

Figure 4:
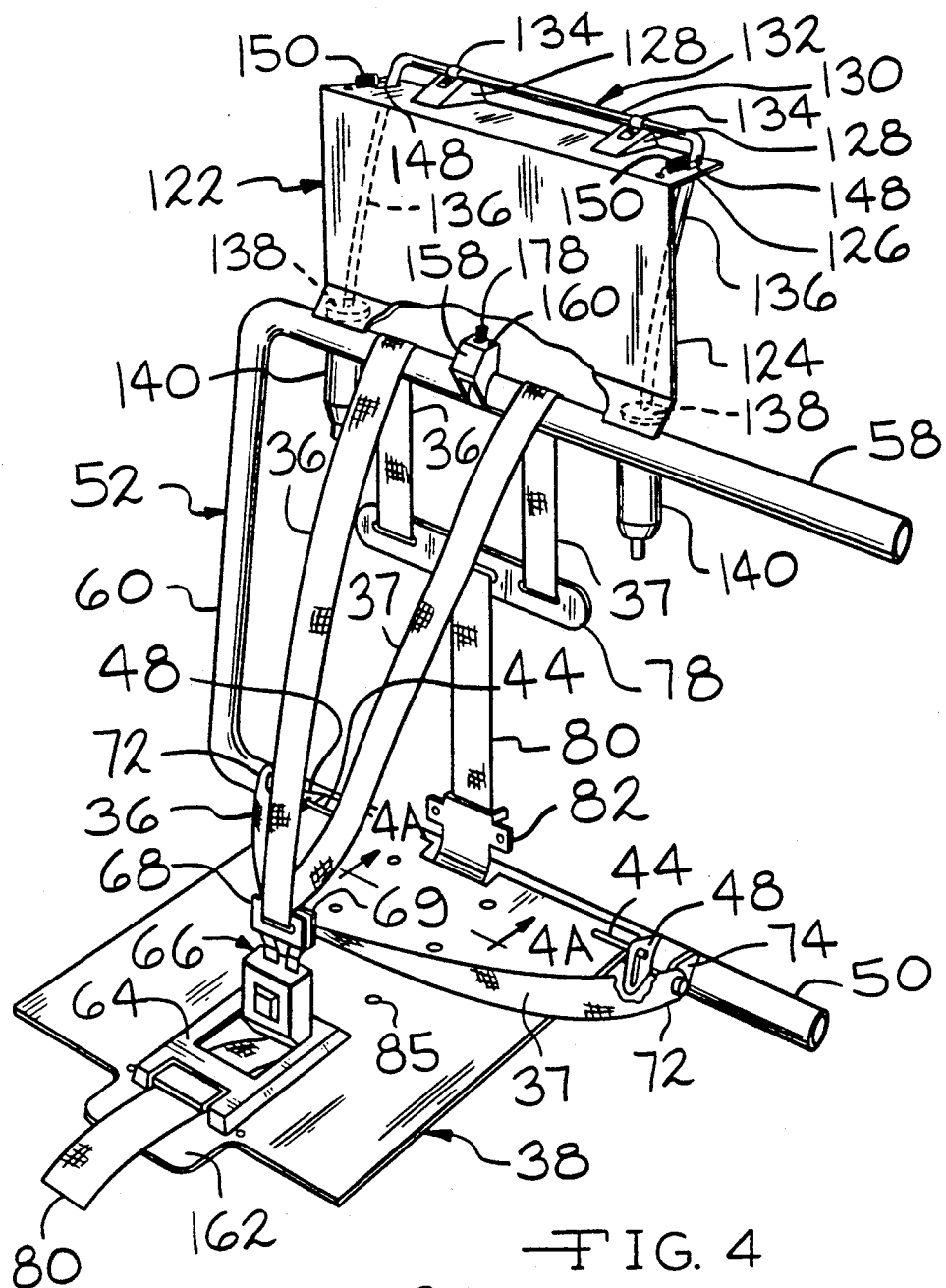
FIG. 4 is a perspective view of the seat assembly structure and the child seat restraint system.

With reference to FIG. 4, the structural elements of the seat assembly and the restraint system of the child seat are shown in greater detail. The seat back frame 52 includes a laterally extending lower tube 50 and a parallel upper tube 58 with generally upright tubes 60 at the ends of the seat back frame, only one of which is shown. Additional upright tubes can be provided as needed, but have been deleted for purposes of clarity. Frame 52 is similar to a frame for a conventional seat back. The child seat assembly is mounted to the seat back frame 52 by welding individual components, as described below, directly to the seat back frame. Alternatively, the child seat assembly can be constructed as a complete module that is in turn attached to the seat back frame 52. While modular construction may result in ease of assembly, there is also an increase in weight associated with the modular design.

A housing 64 is provided at the plate 38 near its forward edge in the lateral center. The housing pivotally mounts a seat belt buckle 66 to the seat cushion plate 38. The details of the buckle mounting are shown in FIG. 5. The child seat restraint system is shown in FIG. 4 in a latched position illustrating the restraint system when in use. The shoulder belts 36 and 37 each carry a latch plate 68 and 69 respectively. The shoulder belts extend through slots 70 in the latch plates. Ends 72 of the shoulder belts are mounted to flanges 74 welded to the lower frame tube 50 adjacent to the mounting flanges 48 at each side of the child seat cushion. The shoulder belts extend through the latch plates and upwardly over the top of the seat back frame upper tube 58. Notches in the upper end of the seat back plate 76 (FIG. 6) retain the shoulder belts laterally at the upper tube 58. Seat back plate 76 is provided to support the back of a child seat occupant.

Figure 4A:
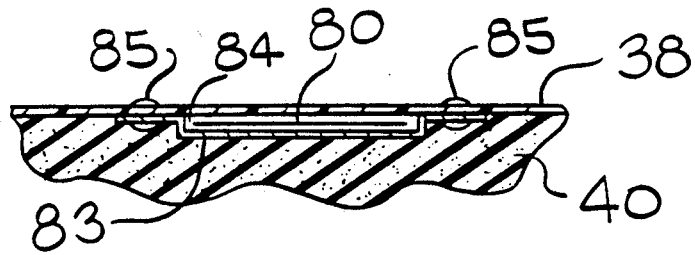
FIG. 4A is a sectional view of the child seat cushion as seen from substantially the line 4A—4A of FIG. 4.

The shoulder belts 36 and 37 extend downwardly behind the upper tube 58 to a yoke 78 and are coupled to the yoke at its outer ends. An adjusting strap 80 is mounted to the center of the yoke and extends downward behind a guide bracket 82 welded to the frame lower tube 50 and through a tunnel 84 on the lower side of the seat cushion plate 38 (FIG. 4A). The adjusting strap 80 ultimately is routed through a clasp 86 (FIG. 5) which comprises a base plate 88 and a spring biased pawl 90 that forces the adjusting strap 80 against the base plate and holds the adjusting strap in place by teeth 92. Rivets 87 secure the base plate 88 to the child seat cushion plate 38. Once a child has been buckled into the child seat, the length of the shoulder belts 36 and 37 extending over the child's shoulders is adjusted by pulling forward on the strap 80 extending from the front edge of the seat cushion. This lowers the yoke 78, pulling on the two shoulder belts 36 and 37 until the desired length is reached. To lengthen the shoulder belts, the clasp is released by raising the tongue 94 on pawl 90 and the shoulder belts are pulled forward out of the seat back. The tunnel 84 is formed by a housing 83 fastened to the plate 38 by rivets 85.

The restraint system shown is a five point restraint system formed by the two shoulder belts, buckled between the legs of the child and extending across the child's lap to two lateral points at the base of the child seat. It is possible to eliminate the lap belt portion of the restraint system resulting in a three point restraint of the two shoulder belts extending over the child's shoulders and buckled between the child's legs.

Additional details of the restraint system are shown in FIG. 5. The buckle 66 includes a housing 96 that is pivotally mounted directly to the housing 64 of the seat cushion plate 38 by a pair of mounting studs 98 extending laterally from the buckle housing 96. The studs extend through the wall 100 of the housing 64 to support the buckle. The buckle is rotatable between a use position shown in FIG. 5 and a forward stowed position within the opening 102 in the housing 64. Rotation of the buckle from the stowed position to the use position shown in FIG. 5 is indicated by the arrow 104. Because the buckle is mounted directly to the seat cushion for rotation about a fixed axis, the buckle does not need to be held by hand to insert the latch plate into the buckle. Instead, the buckle can be raised by inserting the end of the latch plate into the buckle and then latched into the buckle by pushing the latch plate into the buckle. The rigid mounting of the buckle housing to the plate 38 holds the buckle in place when the latch plates are pushed into the buckle. This can be accomplished with one hand instead of two hands as required when the buckle is mounted on a short strap. The buckle includes a release button 71 to release the latch plates as is conventional for restraint system buckles.

The latch plates 68 and 69 each include a planar latch portion 106 having an aperture 108 that is inserted into the slots 110 in the buckle 66. An intermediate portion 112 connects the planar latch portion to a belt attaching portion 114 which is also planar but, due to the bend in the intermediate portion 112, the plane of the attaching portion 114 is offset from that of the latch portion 106. The two latch plates 68 and 69 are identical to one another with latch plate 68 being rotated 180° relative to latch plate 69 when they are inserted into the buckle. By offsetting the planar attaching portions 114 from the latch portions 106, when the latch plates are inserted into the buckle, the attaching portion of latch plate 68 is forwardly of the attaching portion of latch plate 69 and both of the attaching portions 114 are generally positioned above the buckle 66. This configuration of the latch plate is an improvement over prior art latch plate designs which formed the latch portion and attaching portions of the latch plates coplanar. The latch plates, with the latch and attaching portions being coplanar, when buckled, result in the attaching portions being displaced laterally from the buckle and frequently interfering with the child occupant's legs. The present invention, by displacing the belt attaching portions fore and aft of one another, avoids displacing the attaching portions laterally and interfering with the child's legs, improving comfort.

The headrest 22 will now be described in greater detail with reference to FIGS. 4 and 6. The headrest 22 is constructed of an upholstered foam pad 120 mounted to a headrest armature 122. The armature 122 is generally L-shaped in cross section with an upright lower portion 124 and a generally horizontal upper portion 126. The upper portion 126 of the armature is formed with two raised mounting bosses 128 used to couple the armature to the center portion 130 of a U-shaped headrest support post 132 with strap fasteners 134.

The U-shaped headrest support post includes two upright legs 136 that extend downwardly from the center portion 130. The upright legs 136 are carried in bushings 138 that are in turn inserted within metal sleeves 140 welded to the upper seat back frame tube 58. The upright legs 136 include detent notches 144 and 145 that are engaged by spring biased knife plates 146 in the bushings 138 in a conventional manner for a headrest.

As shown in FIG. 6, the upright legs 136 are curved on a large radius rather than being straight. This results in a rearward movement of the headrest as the headrest is raised from the stowed position shown in solid line in FIG. 6 to the phantom line use position. In the embodiment shown, the bushings 138 and sleeves 140 are straight, but provide sufficient clearance internally for the slightly curved legs 136.

The legs 136 extend upward through slots 148 in the upper portion 126 of the headrest armature 122. A pair of biasing springs 150 are coupled to the upper portion of the armature and the upright legs 136. The springs create a moment about the center portion 130 of the support post due to the raised mounting bosses 128. When the headrest is raised to the use position, the springs 150 will cause the lower portion of the headrest to rotate rearward slightly. This improves the alignment of the headrest face 28 relative to the face 32 of the seat back cushion. The upright portion of the headrest armature 124 is formed with a forwardly and downwardly inclined surface 156 at the bottom of the upright portion. When the headrest is in the raised position, the inclined surface 156 rests against the inclined surface 158 of stop 160. The stop 160 limits the rearward rotation of the headrest. The inclined surfaces 156 and 158 serve to rotate the headrest forward when the headrest is being returned to the lower stowed position.

The seat cushion plate 38 includes a tongue 162 that extends from the front edge 164 of the seat cushion. In the stowed position, the tongue 162 is positioned behind the headrest armature as shown in FIG. 6. The tongue serves to prevent rearward rotation of the headrest when in the lowered position and also prevents forward rotation of the seat cushion 20 until after the headrest has been raised.

Figure 8:
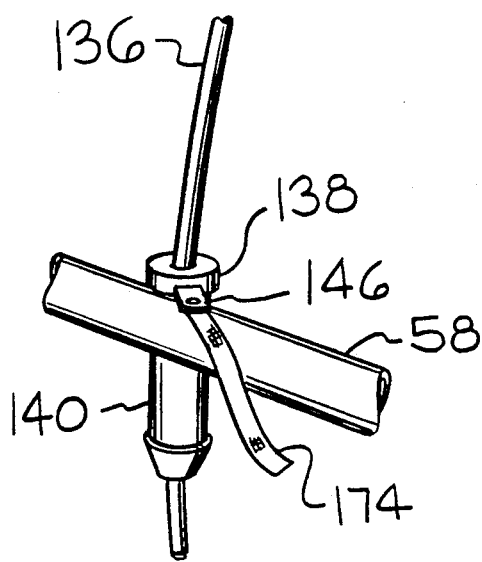
FIG. 8 is a perspective view of the headrest mounting sleeve and bushing.

With reference to FIG. 8, a bushing 138 holding one of the upright legs 136 of the headrest support post is shown in greater detail. The upper end of the bushing includes a spring biased knife plate 146 that engages the upright leg 136 and is seated into the detent notches 144 and 145 in a conventional manner for an adjustable headrest. The upper detent notch 144 is formed with two ramp surfaces 168 that allow the headrest to be moved by a longitudinal force applied to the leg 136. The ramp surfaces 168 move the knife plate out of the detent notch. This allows the headrest to be raised from the lowered position by merely pulling up on the headrest. The lower detent notch 145 has an upper ramp surface 170 and a flat lower surface 172 perpendicular to the length of the leg 136. The flat surface 172 will not move the knife plate out of the detent notch, thus preventing inadvertent removal of the headrest from the seat back.

Figure 9:
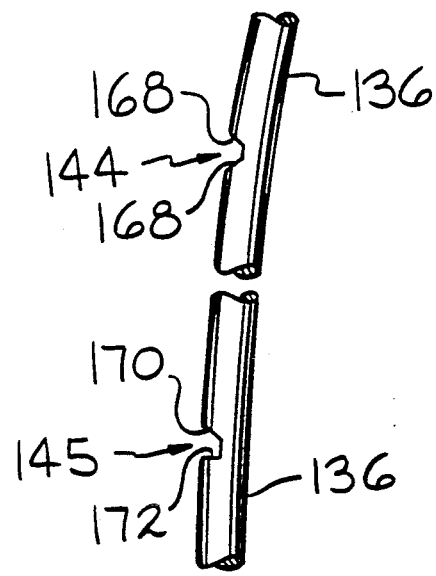
FIG. 9 is a fragmentary perspective view of the headrest support post.

While the headrest can be raised by pulling upward on the headrest, to aid in deployment of the child seat, a pull tab 174 mounted to one knife plate 146 is provided adjacent to the headrest on the face of the seat back to release the headrest. With the use of a pull tab to release the headrest, both the upper and lower detent notches, in the leg 136 that is released by the pull tab, are shaped with the flat lower surface as shown for notch 145 in FIG. 9. By pulling on the tab 174, the knife plate 146 is retracted from the detent notch to release the headrest. A compression spring 178 is positioned on top of the stop 160 to force the headrest up slightly from its stowed position when the tabs 174 are pulled. This indicates to the user the proper direction of travel of the headrest from the stowed to the use positions. After the headrest has been raised by the spring 178, the user grasps the headrest and pulls it the remainder of the distance to the use position. Afterwhich, the seat cushion 20 can be rotated downward to the use position shown in FIG. 1 and the child seat is ready for use. The pull tab 174 is held in place by sewing the tab to the adjacent seat cover on the side bolster 34 by stitches 175. The cover is flexible enough to provide sufficient movement for release of the knife plate. Alternatively, a loop can be sewn to the cover and the pull tab carried by the loop.

Figure 7:
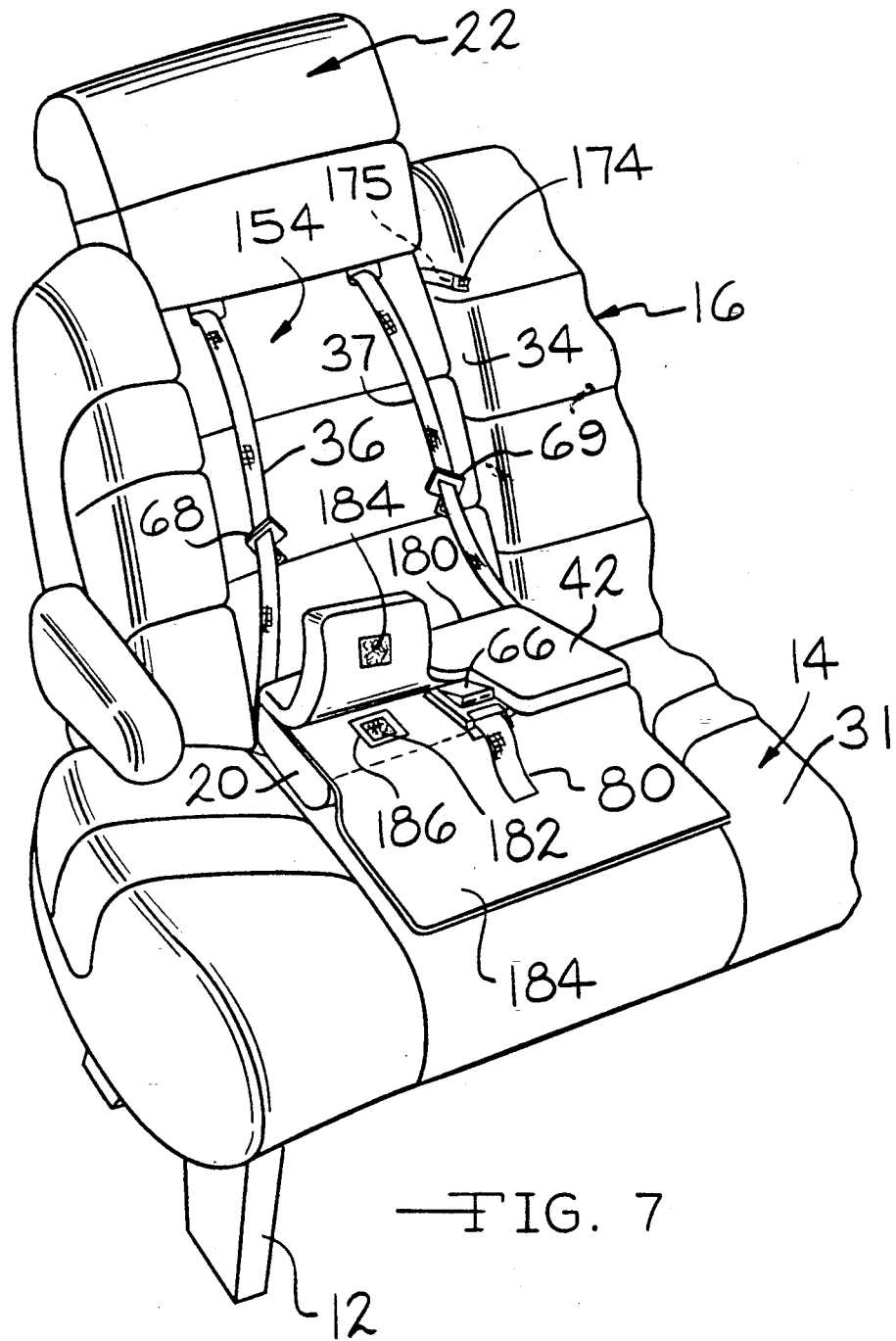
FIG. 7 is a perspective view of the child seat assembly illustrating the attachment of the child seat upholstered pad and seat cover protective flap.

With reference to FIG. 7, the seat cushion pad 42 and the seat back pad 154 are preferably removably mounted to enable the pads to be removed for cleaning. The two pads can be separate pieces or they can be made as a single pad with a hinge connecting portion at the base of the child seat 180. As shown in FIG. 7, the seat cushion pad 42 is mounted to the seat cushion plate 38 by a hook and loop fastener assembly having a hook portion 182 mounted to the child seat plate 38 and a loop portion 184 on the bottom side of the upholstered pad. Other types of releasable fasteners, such as snaps, can also be used.

To protect the surface of the adult seat cushion 31 from the shoes of a child seat occupant, a protective flap 184 is provided which overlies the adult seat cushion forward of the child seat cushion 20. The flap 184 is preferably made of a durable fabric or vinyl that is also readily cleaned. A portion of the protective flap 184 is positioned between the cushion plate 38 and upholstery pad 42. The protective flap is mounted to the each of the fasteners of the upholstered pad 42 to the cushion plate 38. The fasteners extend through the apertures 186 in the protective flap. The protective flap is thus removably mounted to the seat cushion.

The seat assembly of the present invention, with an integrated child seat includes various features that improve the comfort and ease of operation of the child seat. One particular feature is the floating child seat cushion pivot axis which enables the support structure for the child seat cushion to be moved rearward from the face surface of the seat back, improving the comfort of the seat for an adult seat occupant. This also enables a close fit between the adult seat back and the adult seat cushion to be maintained. The child seat assembly also includes a pivotal mounting of the buckle for the child restraint system that enables a user to use one hand to insert the latch plates into the buckle, freeing the other hand for restraining the child. A further feature is the addition of a protective flap that overlies the adult seat cushion forward of the child seat to protect the seat cushion upholstery from wear and dirt from the shoes of a child seat occupant. This protective flap is removably mounted to facilitate cleaning.

It is to be understood that the invention is not limited to the exact construction illustrated and described above, but that various changes and modifications may be made without departing from the spirit and scope of the invention as defined in the following claims.

We claim:

1. A seat assembly for a motor vehicle comprising: an adult seat cushion;
an adult seat back extending upwardly at a rear of said adult seat cushion and including a seat back frame and seat back cushion;
a child seat cushion separable from said adult seat back and having a stowed position extending upwardly from said adult seat cushion and providing a portion of the adult seat back cushion, said child seat cushion being pivotally mounted at a lower end adjacent said adult seat cushion permitting said child seat cushion to be pivoted downward to a use position extending forward from said adult seat back and resting upon said adult seat cushion to form a seat cushion for a child and revealing a recessed portion in said seat back having a face surface recessed rearward from a face surface of said adult seat back cushion;
a protective flap mounted to said child seat cushion and extendable forwardly when said child seat cushion is in the use position to overlie said adult seat cushion forward of said child seat cushion to protect said adult seat cushion from wear and debris from shoes of a child seat occupant;
mounting means for pivotally mounting said child seat to said adult seat back with a floating pivot axis that rises from a first position corresponding to the stowed position of the child seat cushion to a second position corresponding to the use position of said child seat cushion;
restraint means for restraining a child occupant in said child seat, said restraint means including a buckle having a housing pivotally attached to said child seat cushion for rotation about an axis fixed to said child seat cushion;
a child headrest movably mounted to said seat back having a stowed position in which said headrest forms a portion of said seat back cushion immediately above said child seat cushion when said child seat cushion is in said stowed position and said headrest having a face surface substantially even with the face surface of the adult seat back, said headrest being mounted to said seat back for movement to a use position upward and rearward of said stowed position where said headrest face surface forms a substantial continuation of the face surface of said recessed portion;
means for retaining said headrest in said stowed and use positions;
means for manually releasing said retaining means when said headrest is in said stowed position; and
bias means to move said headrest from said stowed position toward said release position when said retaining means is manually released.

2. A seat assembly for a motor vehicle comprising: an adult seat cushion;
an adult seat back extending upwardly at a rear of said adult seat cushion and including a seat back frame and seat back cushion;
a child seat cushion separable from said adult seat back and having a stowed position extending upwardly from said adult seat cushion and providing a portion of the adult seat back cushion, said child seat cushion being pivotally mounted at a lower end adjacent said adult seat cushion permitting said child seat cushion to be pivoted downward to a use position extending forward from said adult seat back and resting upon said adult seat cushion to form a seat cushion for a child and revealing a recessed portion in said seat back having a face surface recessed rearward from a face surface of said adult seat back cushion;

mounting means for pivotally mounting said child seat to said adult seat back with a floating pivot axis that rises from a first position corresponding to the stowed position of the child seat cushion to a second position corresponding to the use position of said child seat cushion;

a child headrest movably mounted to said seat back having a stowed position in which said headrest forms a portion of said seat back cushion immediately above said child seat cushion when said child seat cushion is in said stowed position and said headrest having a face surface substantially even with the face surface of the adult seat back, said headrest being mounted to said seat back for movement to a use position upward and rearward of said stowed position where said headrest face surface forms a substantial continuation of the face surface of said recessed portion; and restraint means for restraining a child occupant in said child seat.

3. The seat assembly of claim 2 wherein said mounting means for said child seat cushion includes a pair of pivot pins extending laterally from said child seat cushion and defining a pivot axis for said child seat cushion and means for mounting said pivot pins to said seat back frame for translation of said pivot pins along a predetermined path.

4. The seat assembly of claim 3 wherein said predetermined path is formed by a pair of mounting flanges secured to said seat back frame and each having a slot therein through which said pivot pins extend.

5. The seat assembly of claim 2 wherein said restraint means includes a buckle having a housing pivotally attached to said child seat cushion for rotation about an axis fixed to said child seat cushion, said buckle having a stowed position substantially within said child seat cushion and a use position extending generally upwardly from a child seating surface of said child seat cushion between the legs of a child when said child seat cushion is in said use position.

6. The seat assembly of claim 5 wherein said restraint means includes two shoulder belts for passing over the shoulders of a child seated on said child seat cushion and each shoulder belt having a latch plate for locking insertion into said buckle, said shoulder belts passing into said adult seat back behind a portion of said seat back frame whereby forward loads applied to said shoulder belts are transferred directly to said seat back frame; and adjustment means for adjusting the length of said shoulder belts, said adjustment means including an adjusting strap connected to said shoulder belts in said adult seat back and being routed behind a lower portion of said adult seat back frame and through a passageway in said child seat cushion and extending forwardly from a front edge of said child seat cushion when in said use position; and selectively releasable locking means for holding said adjusting strap fixed relative to said child seat cushion.

7. The seat assembly of claim 6 wherein said latch plates each have a planar latch portion for insertion into said buckle and a planar attaching portion for attachment of said shoulder belts to said latch plates, said planar attaching portions being parallel and offset from the planar latch portions, said buckle having a pair of laterally spaced parallel slots for reception of the latch portions of said latch plates therein, the planar attaching portion of one latch plate being offset rearwardly from its latch portion while the attaching portion of the other latch plate is offset forwardly of its latch portion.

8. The seat assembly of claim 2 further comprising a protective flap mounted to said child seat cushion and extendable forwardly when said child seat cushion is in the use position to overlie said adult seat cushion forward of said child seat cushion to protect said adult seat cushion from wear and debris from shoes of a child seat occupant.

9. The seat assembly of claim 2 further comprising:
a seat cover attached to said upper seating surface of said child seat cushion;
releasable attachment means for releasably attaching said seat cover to said child seat cushion at least two discrete locations; and
a protective cover extendable from the child seat cushion when in the second position to overlie and protect the adult seat cushion forwardly of said child seat cushion, a portion of said protective cover being disposed between said child seat cushion and said child seat cushion cover and including apertures at the locations of said releasable attaching means whereby said seat cover is attached to said child seat cushion through said apertures in said protective cover to retain said protective cover to said child seat cushion.

10. The seat assembly of claim 2 wherein said headrest includes a pad member;
a support post having a pair of legs movably mounted to said seat back frame through a pair of mounting bushings;
attaching means for pivotally attaching said pad member to said support post; and
bias means to rotate said pad member rearward when the headrest is raised to said use position.

11. The seat assembly of claim 10 wherein at least one of said legs of said support post includes a pair of spaced detents;
a knife plate engagable with one of said detents when said headrest is in the stowed position and engagable with the other detent when the headrest is in the use position; and
means for manually releasing the knife plate from one of said detents when the headrest is in the lowered position and bias means for partially raising said headrest from the stowed position upon manual release of said knife plate.

12. The seat assembly of claim 11 wherein said manual release means includes a pull tab attached to said knife edge and extending from the face of said adult seat back for pulling to manually release said knife edge.

13. A seat assembly for a motor vehicle comprising:
an adult seat cushion;
an adult seat back extending upwardly at a rear of said adult seat cushion and including a seat back frame and seat back cushion;
a child seat assembly integral with said seat assembly, said child seat assembly including a child seat cushion and a restraint system for a child seat occupant;
said restraint system including a buckle, said buckle including a rigid housing pivotally attached to said child seat cushion for rotation about an axis fixed to said child seat cushion.

14. A seat assembly for a motor vehicle comprising:
an adult seat cushion;

an adult seat back extending upwardly at a rear of said adult seat cushion and including a seat back frame and seat back cushion;

a child seat integral with said seat assembly including a child seat cushion upon which a child seat occupant is seated when in a use position overlaying said adult seat cushion, said child seat cushion including a child seat cushion support plate, a pad member covering the top of said support plate when the child seat cushion is in said use position and releasable fastener means for securing said pad member to said support plate; and a flexible cover member extending from said child seat cushion and overlaying a portion of said adult seat cushion when said child seat cushion is in said use position to protect said adult seat cushion, a portion of said flexible member being disposed between said support plate and said pad member and including at least one aperture for said releasable fastener means to extend through whereby said flexible member is retained on said child seat cushion.

15. A seat assembly for a motor vehicle comprising:
an adult seat cushion;
an adult seat back extending upwardly at a rear of said adult seat cushion and including a seat back frame and seat back cushion having a forwardly facing seat back surface;
a child seat assembly integral with said seat assembly including a headrest, said headrest being mounted to said adult seat back and having a forwardly facing front surface;
said headrest having means for moving said headrest from a stowed position in which said headrest front surface forms a portion of said seat back surface to a use position upward and rearward of said stowed position in which said headrest forms a head restraint for a child seat occupant with said front surface facing forwardly;
said moving means including a headrest support post having a pair of downward extending legs, a pair of bushings carried by said seat back frame in which said legs are disposed and movable in the direction of said legs and means on said legs and in said bushings for retaining said legs in said stowed or use positions of said headrest;

means for manually releasing said retaining means when said headrest is in said stowed position; and
bias means for partially moving said headrest from said stowed position when said retaining means is manually released to indicate the direction of movement of the headrest from said stowed to said use positions.

16. The seat assembly of claim 15 wherein said bias means includes a compression spring that is compressed when said headrest is moved downward into said stowed position where said retaining means holds said headrest in opposition to said compression spring.

17. The seat assembly of claim 15 further comprising means for pivotally mounting said headrest to said support post and spring means for rotating a lower portion of said headrest rearward as said headrest is raised to said use position.

18. The seat assembly of claim 17 further comprising a stop engagable with said lower portion to limit rearward rotation of said headrest, said stop and said headrest having downwardly and forwardly inclined engaging surfaces to rotate the lower portion of the headrest forward as movement of the headrest from the use to the stowed positions begins.

19. A seat assembly for a motor vehicle comprising:
an adult seat cushion;
an adult seat back extending upwardly at a rear of said adult seat cushion and including a seat back frame and seat back cushion;
a child seat cushion separable from said adult seat back and having a stowed position extending upwardly from said adult seat cushion and providing a portion of the adult seat back cushion, said child seat cushion being pivotally mounted at a lower end adjacent said adult seat cushion permitting said child seat cushion to be pivoted downward to a use position extending forward from said adult seat back and resting upon said adult seat cushion to form a seat cushion for a child and revealing a recessed portion in said seat back having a face surface recessed rearward from a face surface of said adult seat back cushion; and
mounting means for pivotally mounting said child seat to said adult seat back with a floating pivot axis that rises from a first position corresponding to the stowed position of the child seat cushion to a second position corresponding to the use position of said child seat cushion.

* * * * *